(12) United States Patent
Kageyama (10) Patent No.: US 10,904,451 B2
(45) Date of Patent: Jan. 26, 2021

(54) IMAGE PICKUP APPARATUS CONTROLLING FLASHES, AND CONTROL METHOD THEREFOR (71) Applicant: CANON KABUSHIKI KAISHA, Tokyo (JP)

(72) Inventor: Takashi Kageyama, Yokosuka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 70 days.

(21) Appl. No.: 16/251,316

(22) Filed: Jan. 18, 2019

(65) Prior Publication Data
US 2019/0230271 A1 Jul. 25, 2019

(30) Foreign Application Priority Data

Jan. 23, 2018 (JP) ................................. 2018-008883

(51) Int. Cl.
*H04N 5/235* (2006.01)
*H04N 5/225* (2006.01)
*G06T 7/194* (2017.01)

(52) U.S. Cl.
CPC ........... *H04N 5/2354* (2013.01); *G06T 7/194* (2017.01); *H04N 5/2256* (2013.01)

(58) Field of Classification Search
CPC .. H04N 5/2354; H04N 5/2256; G06F 9/3004; G06T 7/194; G03B 7/16; G03B 7/17
See application file for complete search history.

(56) References Cited

U.S. PATENT DOCUMENTS 8,435,157 B2   5/2013  Matsui
2013/0050510 A1*  2/2013  Fujihashi ............... G03B 17/02
                                        348/207.1

FOREIGN PATENT DOCUMENTS

JP  S63204238 A   8/1988
JP  H04340527 A  11/1992
JP  2011137960 A  7/2011
JP  2011221364 A  11/2011

\* cited by examiner

*Primary Examiner* — Nelson D. Hernández Hernández
(74) *Attorney, Agent, or Firm* — Rossi, Kimms & McDowell LLP

(57) ABSTRACT

An image pickup apparatus that is capable of automatically finding an irradiation angle of each external flash in photographing using a plurality of external flashes. An image pickup apparatus controls external flashes that are communicably connected to one another and have light emitting units of which irradiation angles are variable. A photometry device obtains a photometry value. A memory device stores a set of instructions. At least one processor that executes the set of instructions to: obtain photometry values at times of emissions at each of different irradiation angles for each of the external flashes, generate an evaluation value at each of the different irradiation angles based on a photometry result obtained by the photometry device, and decide an irradiation angle for photographing of each of the external flashes based on the evaluation values generated.

14 Claims, 9 Drawing Sheets

IMAGE PICKUP APPARATUS CONTROLLING FLASHES, AND CONTROL METHOD THEREFOR

BACKGROUND OF THE INVENTION

Field of the Invention

The present invention relates to an image pickup apparatus, such as a digital camera, that controls a plurality of flashes including a receiver-flash, and a control method therefor.

Description of the Related Art

There is a known image pickup apparatus, such as a digital camera, that does not only irradiate an object directly with flash light but also enables what is called a bounce flash photographing by irradiating the entire area including the object with flash light that is directed to a ceiling by changing a flash-light irradiation angle and is reflected and diffused by the ceiling. Use of a receiver-flash during the bounce flash photographing enables various expressions. For example, a light amount balance between irradiation light from a right side of an object and irradiation light from a left side can be changed, and a shadow appearing in a background can be eliminated by irradiation light toward the background.

Appropriate determination of the irradiation direction of the flash light in photographing using a receiver-flash and the bounce flash photographing requires time and effort from a photographer. For example, an appropriate irradiation direction of flash light in the bounce flash photographing is decided by repeating test photographing at several times. In the photographing using a receiver-flash, if an irradiation direction of flash light of the installed receiver-flash has shifted from a direction toward a target, a photographer must go to the receiver-flash and adjust the irradiation direction.

In view of such failure, Japanese Laid-Open Patent Publication (Kokai) No. 2011-221364 (JP 2011-221364A) suggests a technique that repeats emission and photometry while changing an irradiation angle of flash light and stores the irradiation angle at which the maximum photometry value among the obtained photometry values except for photometry values within a predetermined range has been obtained. This suggestion enables to automatically find the angle at which an irradiation light amount to an object is maximized except for the irradiation angles directly directed to the object as the irradiation angle for the bounce flash photographing.

However, the technique disclosed in the above-mentioned publication cannot automatically find the irradiation angle of each receiver-flash in the photographing using a plurality of receiver-flashes.

SUMMARY OF THE INVENTION

The present invention provides an image pickup apparatus and a control method therefor, which are capable of automatically finding an irradiation angle of each external flash in photographing using a plurality of external flashes.

Accordingly, a first aspect of the present invention provides an image pickup apparatus controlling external flashes that are communicably connected to one another and have light emitting units of which irradiation angles are variable, the image pickup apparatus comprising a photometry device that obtains a photometry value, a memory device that stores a set of instructions, and at least one processor that executes the set of instructions to: obtain photometry values at times of emissions at each of different irradiation angles for each of the external flashes, generate an evaluation value at each of the different irradiation angles based on a photometry result obtained by the photometry device, and decide an irradiation angle for photographing of each of the external flashes based on the evaluation values generated.

Accordingly, a second aspect of the present invention provides a control method for an image pickup apparatus controlling external flashes that are communicably connected to one another and have light emitting units of which irradiation angles are variable, the control method comprising a photometry step of obtaining photometry values at times of emissions at each of different irradiation angles for each of the external flashes, a generation step of generating an evaluation value at each of the different irradiation angles based on a photometry result obtained in the photometry step, and a decision step of deciding an irradiation angle of each of the external flashes based on the evaluation values generated in the generation step.

According to the present invention, an irradiation angle of each external flash is controlled so as to irradiate an object or a background of the object in accordance with a setting in photographing using a plurality of external flashes.

Further features of the present invention will become apparent from the following description of exemplary embodiments with reference to the attached drawings.

DESCRIPTION OF THE EMBODIMENTS

Hereafter, embodiments according to the present invention will be described in detail by referring to the drawings.

Figure 1:
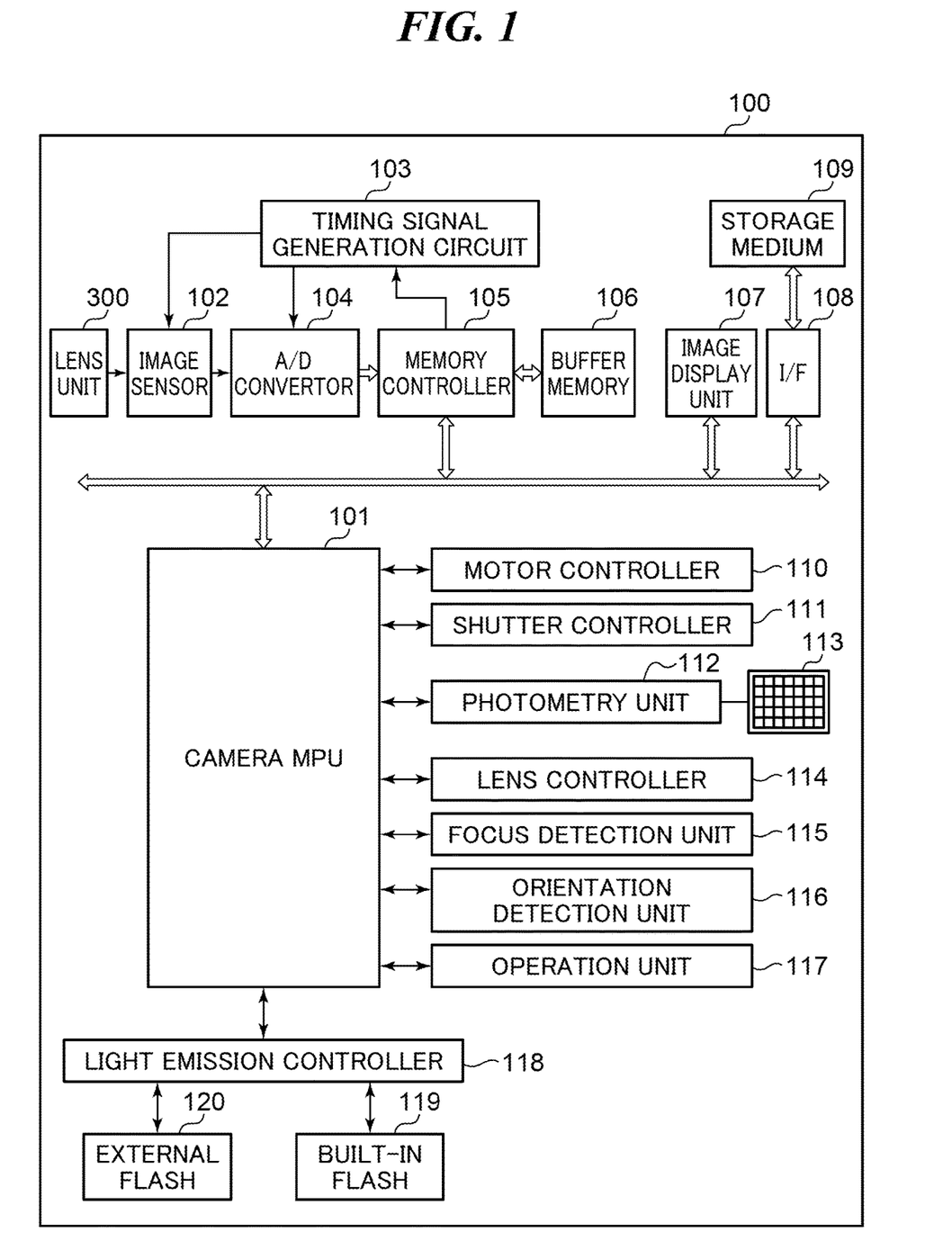
FIG. 1 is a block diagram schematically showing a configuration example of a digital camera as an image pickup apparatus according to a first embodiment of the present invention.

FIG. 1 is a block diagram schematically showing a configuration example of a digital camera 100 (hereinafter referred to as a camera 100) as an image pickup apparatus according to a first embodiment of the present invention.

A camera MPU 101 shown in FIG. 1 is a microcontroller (processor) that controls actions of the entire camera 100. An image pickup device 102 is constituted by a CCD sensor or a CMOS sensor that converts reflected light from an object into an electrical signal. A timing signal generating circuit 103 generates a timing signal required to drive the image pickup device 102. An A/D converter 104 converts analog image data read from the image pickup device 102 into digital image data. A memory controller 105 controls reading and writing of a memory and a refreshment operation of a buffer memory 106.

An image display unit 107 displays image data stored in the buffer memory 106. An interface (I/F) 108 connects a recording media 109, such as a memory card and a hard disk to the camera MPU 101. A motor controller 110 raises and lowers a mirror (not shown) to change an optical path of a light flux entering through a lens unit 300 by controlling a motor (not shown) according to a signal from the camera MPU 101. When the mirror is risen, the light flux entered through the lens unit 300 is guided to the image pickup device 102 etc. When the mirror is lowered, the light flux entered through the lens unit 300 is guided to a photometry sensor 113 etc.

A shutter controller 111 controls a shutter (not shown) that is arranged in front of the image pickup device 102 to switch the image pickup device 102 between a shading state and an exposure state according to a signal from the camera MPU 101. A photometry unit (photometry device) 112 outputs a photometry value that is a photometry result of each area to the camera MPU 101 on the basis of an output of the photometry sensor 113 of which an image pickup screen is divided into a plurality of areas.

The camera MPU 101 performs exposure calculation for deciding an AV (aperture value), a TV (shutter speed), and an ISO (image capturing sensitivity) that are exposure control values during photographing on the basis of the photometry values of the respective areas. Moreover, the camera MPU 101 calculates an emission amount of a built-in flash 119 or an external flash 120 at the time of flash light photographing on the basis of the photometry value output from the photometry unit 112 at the time of pre-flash toward an object by the built-in flash 119 or the external flash 120.

A lens controller 114 adjusts focus and aperture of the lens unit 300 by controlling a lens drive motor and diaphragm drive motor (not shown) according to a signal from the camera MPU 101. The focus detection unit 115 outputs a defocus amount at each distance measurement point to the camera MPU 101 on the basis of outputs of a focus detection sensor equipped with a plurality of distance measurement points in the image pickup screen. The camera MPU 101 instructs the lens controller 114 to perform a focusing action on the basis of the defocus amount output from the focus detection unit 115.

An orientation detection unit 116 is constituted by acceleration sensors etc., and detects the posture of the camera 100 in a gravity direction. An operation unit 117 includes a release button that receives a start instruction for a photographing preparation operation or a photographing operation. When a SW1 turns ON by a first stroke (half press) of the release button, the camera MPU 101 designates start of the photographing preparation operations, such as a focus detecting operation and a photometry operation. Moreover, when a SW2 turns ON by a second stroke (full press) of the release button, the camera MPU 101 starts the photographing operation. When the status of the SW1 varies from an ON-state to an OFF-state, the camera MPU 101 measures elapsed time from a timing at which the SW1 turns OFF with a built-in timer.

Moreover, the operation unit 117 includes an automatic irradiation-angle decision switch that defines whether a function for automatically deciding a suitable irradiation direction in a bounce emission photographing or a function (hereinafter, referred to as an automatic irradiation-angle decision) for automatically deciding an irradiation angle of a flash when a wireless setting turns "ON" is activated.

When using the built-in flash 119, the emission controller 118 controls an emission pattern and an emission amount of preliminary emission or main emission according to a signal from the camera MPU 101. Moreover, the emission controller 118 switches a control target between the built-in flash 119 and the external flash 120 according to a signal from the camera MPU 101.

Figure 3:
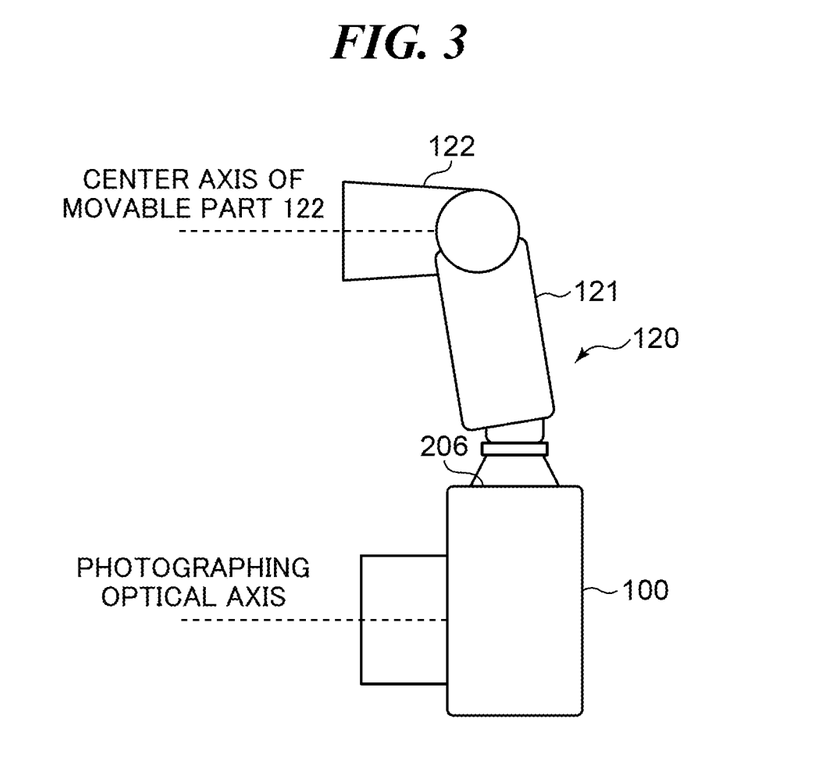
FIG. 3 is a view showing a state where the digital camera is equipped with the external flash.

In this embodiment, a case where the external flash 120 is controlled according to the signal from the camera MPU 101 in the camera system including the camera 100 and the external flash 120 as shown in FIG. 3 will be described. It should be noted that the external flash 120 may be detachably attached to the camera 100 in place of the built-in flash 119.

Figure 2:
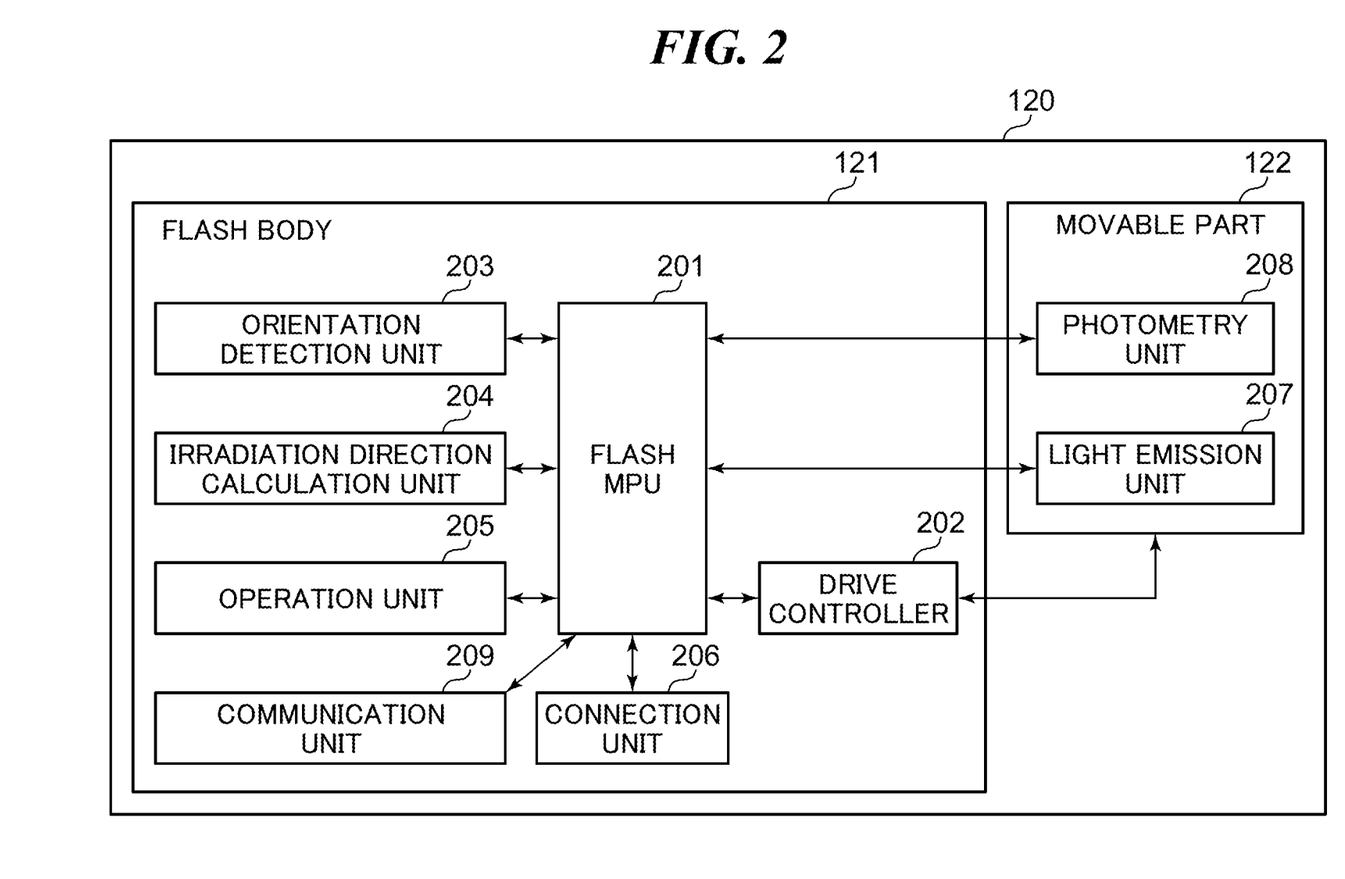
FIG. 2 is a block diagram showing a configuration example of an external flash.

Next, the external flash 120 that is detachably attached to the camera 100 will be described by referring to FIG. 2. FIG. 2 is a block diagram showing a configuration example of the external flash 120.

As shown in FIG. 2, the external flash 120 is provided with a flash body 121 that is attached to the camera 100 and a movable part 122 that is held by the flash body 121 so as to be pivotable in an up-and-down direction (a direction of an elevation angle) and a left-and-right direction (a direction of a rotation angle) to the flash body 121. It should be noted that a well-known mechanism may be used as the mechanism that holds the movable part 122 so as to be pivotable in the up-and-down direction (the direction of the elevation angle) and the left-and-right direction (the direction of the rotation angle) to the flash body 121. For example, since the mechanism described in the Japanese Laid-Open Patent Publication (Kokai) No. S63-204238 (JP S63-204238A) or Japanese Laid-Open Patent Publication (Kokai) No. 2011-137960 (JP 2011-137960A) may be used, its detailed description is omitted.

The flash body 121 has a flash MPU 201, a drive controller 202, an orientation detection unit 203, an irradiation direction calculation unit 204, an operation unit 205, a connection unit 206, and a communication unit 209. The movable part 122 has a light emitting unit 207 and a photometry unit 208. In this embodiment, a wireless transmitter that does not have the movable part 122 (including the light emitting unit 207 and the photometry unit 208) and relays the camera 100 to the plurality of external flashes 120 using the communication unit 209 is treated as a kind of the external flashes 120. Although the plurality of external flashes 120 are wirelessly connected in this embodiment, they may be connected with a wire.

The flash MPU 201 is a microcontroller (processor) that controls actions of the entire external flash 120. The drive controller 202 makes the movable part 122 drive in the up-and-down direction and left-and-right direction to the flash body 121 by controlling a motor (not shown) according to signals from the flash MPU 201. Moreover, the drive controller 202 obtains a drive amount from a reference position of the movable part 122 to the flash body 121 using an encoder etc., and outputs it to the flash MPU 201. For example, the reference position of the movable part 122 to the flash body 121 may be defined as a position where a center axis of the movable part 122 becomes parallel to the photographing optical axis of the camera 100 in a state where the external flash 120 is attached to the camera 100 as shown in FIG. 3.

The orientation detection unit 203 is constituted by acceleration sensors etc. and detects the orientation of the flash body 121. The irradiation direction calculation unit 204 calculates the optimal irradiation direction in the bounce emission photographing on the basis of the information obtained by the orientation detection unit 203 and the information obtained by the photometry unit 208. Details of the irradiation direction calculation process will be described later.

The operation unit 205 includes an automatic irradiation-angle decision switch that defines whether automatic irradiation-angle decision is performed. When the setting of the automatic irradiation-angle decision switch of the operation unit 117 of the camera 100 differs from the setting of the automatic irradiation-angle decision switch of the operation unit 205 of the external flash 120, priority may be given to one of the settings. Alternatively, the setting of the automatic irradiation-angle decision switch of the operation unit 117 of the camera 100 and the setting of the automatic irradiation-angle decision switch of the operation unit 205 of the external flash 120 may be interlocked. That is, when the setting of one automatic irradiation-angle decision switch is changed, the setting of the other automatic irradiation-angle decision switch may be automatically changed.

Moreover, the operation unit 205 includes a wireless setting switch that switches a wireless mode of the external flash 120. The external flash 120 has a wireless function and is able to be set to either of a sender-flash and a receiver-flash when the wireless mode is "ON". However, the wireless transmitter without the light emitting unit 207 is a master dedicated device in the wireless mode, cannot turn "OFF" the wireless mode, and cannot be set to the receiver-flash.

When the external flash 120 is set to the receiver-flash, the connection unit 206 is not used basically, and it is assumed that a user installs the external flash 120 alone at an optional position. The user is able to select a flash group to which the installed external flash 120 belongs through the operation unit 205. In this embodiment, a plurality of flashes are classified into three groups A, B, and C. Irradiation modes are allocated to the respective flash groups. For example, the flash groups A and B are groups to which object-irradiation flashes belong, and the flash group C is a group to which background-irradiation flashes belong.

Incidentally, the plurality of external flashes 120 may belong to the same flash group as receiver-flashes. In such a case, the camera MPU 101 controls emission amounts of the respective flashes at the time of flash photographing with the camera 100 as if all the receiver-flashes belonging to the same flash group is one flash.

The connection unit 206 has an attachment part for attaching to the camera 100 and a contact part having communication contact points. The flash MPU 201 communicates with the camera 100 through the contact member of the connection unit 206. The communication unit 209 acts as a module for connecting with other devices through the wireless communication and as its controller. The communication unit 209 mainly assumes that the external flash 120 set as the sender-flash and the external flash 120 set as the receiver-flash are connected. The communication unit 209 handles transmission of various kinds of information, such as an emission amount, an emission timing, setting variation, and a state notification, and is controlled by the flash MPU 201.

The light emitting unit 207 uses a flash discharge tube or an LED as a light source, is provided with a resin-made optical element in front of the light source, and makes the light source emit according to an emission signal from the flash MPU 201. The photometry unit 208 is provided so that a light receiving surface of a photosensor is directed in the same direction as the irradiation direction of the light emitting unit 207 and outputs a signal corresponding to light flux that the photosensor receives to the flash MPU 201.

Then, the flash MPU 201 calculates a distance from an irradiation surface of the optical element of the light emitting unit 207 to an irradiation target on the basis of a signal output from the photometry unit 208 that receives a reflected light flux reflected by the irradiation target at the time of emission of the light emitting unit 207. It should be noted that the orientation and position of the photosensor are not limited to the above-mentioned example. The reflected light flux from the irradiation target may be received through a light guiding member, such as an optical fiber of which an incident surface is directed to the same direction as the irradiation direction of the light emitting unit 207.

Next, an automatic angle-decision control of a flash-light irradiation angle will be described by referring to FIG. 4. When the flash MPU 201 detects that a user operates the automatic irradiation-angle decision switch of the operation unit 205 of the external flash 120, the camera MPU 101 of the camera 100 obtains the operation information through the connection unit 206 of the external flash 120. Alternatively, when the user operates the automatic irradiation-angle decision switch of the operation unit 117 of the camera 100, the camera MPU 101 obtains the operation information. Then, each process in FIG. 4 is executed when the camera MPU 101 runs a program that is stored in a ROM (not shown) of the camera 100 and is developed to a RAM.

Figure 4:
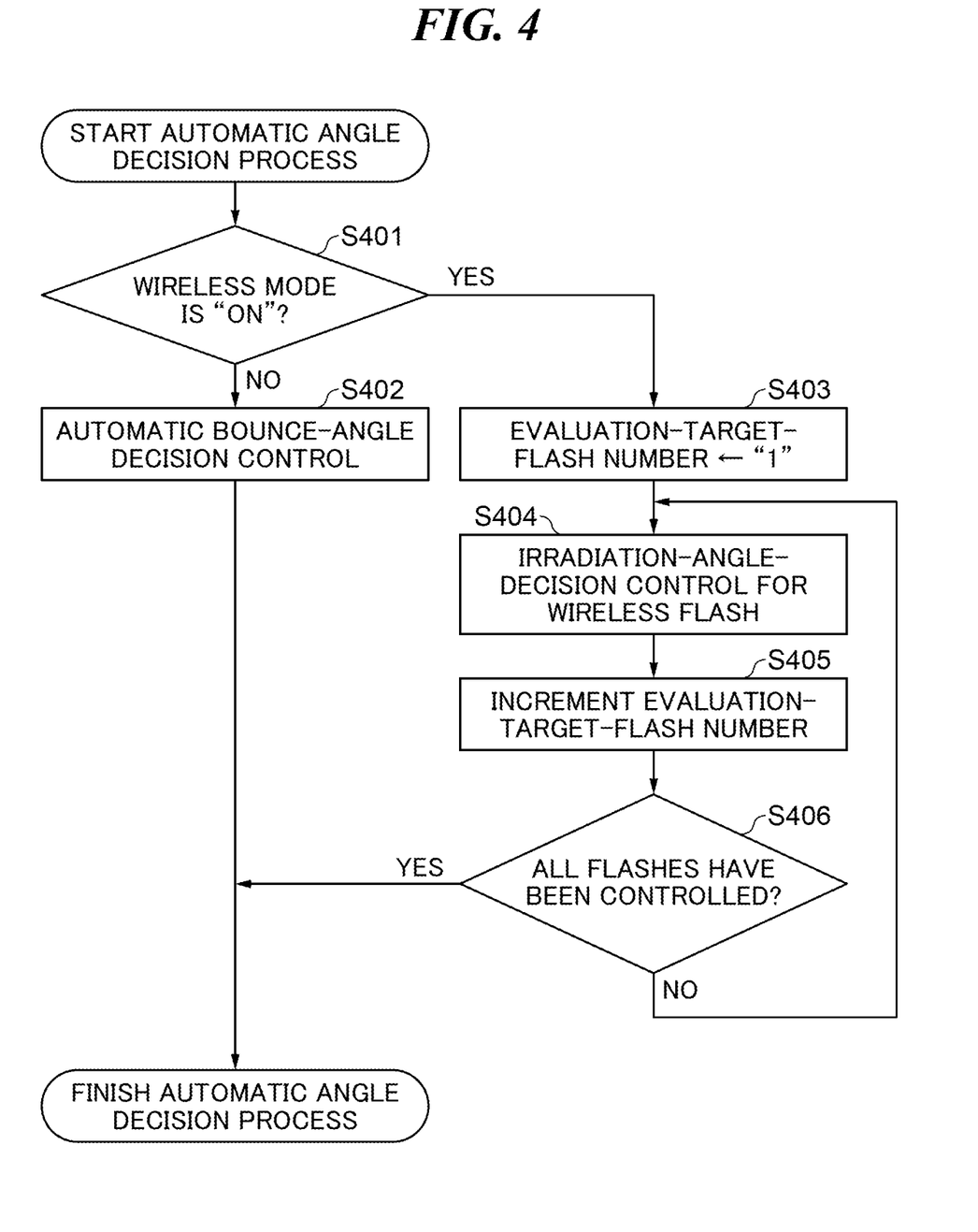
FIG. 4 is a flowchart describing automatic angle-decision control for a flash-light irradiation angle.

In step S401 in FIG. 4, the camera MPU 101 obtains wireless mode information through the connection unit 206 of the external flash 120 and determines whether the wireless mode is ON. When the wireless mode is "OFF", the camera MPU 101 proceeds with the process to step S402. When the wireless mode is "ON", the camera MPU 101 proceeds with the process to step S403. In the step S402, the camera MPU 101 performs control (automatic bounce-angle decision control) for automatically deciding the optimal irradiation direction in the bounce emission photographing according to the technique disclosed in Japanese Laid-Open Patent Publication (Kokai) No. H04-340527 (JP H04-340527A), for example, and finishes the process.

In the step S403, the camera MPU 101 starts automatic irradiation-angle decision control for flashes, which include the sender-flash (except a wireless transmitter) connected to the camera 100 and all the receiver-flashes connected by wireless, one by one. At that time, the camera MPU 101 sequentially gives flash numbers to flashes of the flash group A from "1", to flashes of the flash group B subsequently, and then to flashes of the flash group C.

For example, three flashes shall belong to the flash group A, two flashes shall belong to the flash group B, and two flashes shall belong to the flash group C. In this case, the flash numbers 1, 2, and 3 are given to the flashes of the flash group A, the flash numbers 4 and 5 are given to the flashes of the flash group B, and the flash numbers 6 and 7 are given to the flashes of the flash group C. This order is determined so that the object-irradiation flashes are numbered first and the background-irradiation flashes are numbered afterward. In the description, the camera MPU 101 sets an evaluation-target-flash number to "1" first, starts irradiation-angle-decision control for the flash of which the flash number is "1", and proceeds with the process to step S404.

The camera MPU 101 controls the photometry unit 112 and controls the flash MPU 201 of the external flash 120

(sender-flash) through the connection unit 206 to perform wireless flash irradiation-angle-decision control in the step S404 and proceeds with the process to step S405. It should be noted that the control of the flash MPU 201 of the external flash 120 (sender-flash) by the camera MPU 101 includes the control of the receiver-flash through the communication unit 209 of the sender-flash. Details of the irradiation-angle-decision control of each wireless flash will be described later using FIG. 5 and FIG. 6.

The camera MPU 101 increments the evaluation-target-flash number in the step S405 and proceeds with the process to step S406. In the step S406, when there is a flash corresponding to the current evaluation-target-flash number, the camera MPU 101 returns the process to the step S404. When the irradiation-angle-decision control for all the flashes has finished, the process in FIG. 4 finishes. Thus, the flash-light-irradiation-angle decision control is performed for each flash one by one.

Next, the irradiation-angle-decision control process for each wireless flash in the step S404 in FIG. 4 will be described by referring to FIG. 5 and FIG. 6.

Figure 5:
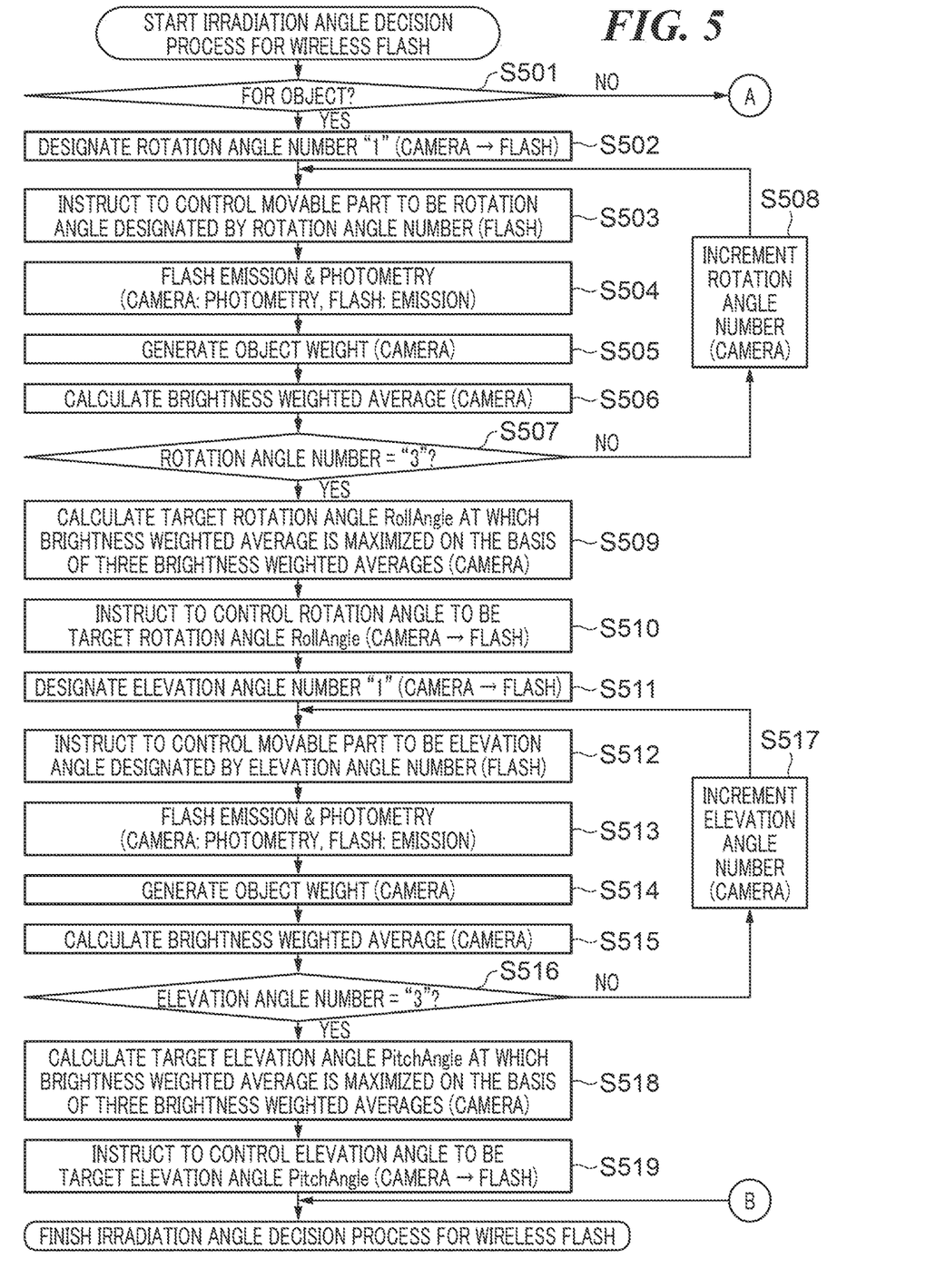
FIG. 5 is a flowchart describing automatic irradiation-angle decision control for each wireless flash.

In step S501 in FIG. 5, the camera MPU 101 determines whether the flash corresponding to the current evaluation-target-flash number belongs to the object-irradiation flash group A or B. When the flash belongs to the object-irradiation flash group A or B, the camera MPU 101 proceeds with the process to step S502. Otherwise, the process proceeds to step S520 in FIG. 6.

In the step S502, the camera MPU 101 starts rotation-angle decision control. A reason why the rotation-angle decision control is performed prior to elevation-angle decision will be described. A user arranges a receiver-flash. Although a case where a receiver-flash is installed in a tripod that stands on the same floor on which a tripod of the camera 100 stands, a case where a receiver-flash is directly placed on a floor, etc. are assumed, a receiver-flash is basically arranged so that the connection unit 206 will be a floor side in many cases.

Accordingly, when the center axis (irradiation direction) of the movable part 122 to the flash body 121 of the receiver-flash is directed in a photographing direction (an object direction) of the camera 100 as a result of the rotation angle decision, the photometry sensor 113 and the photometry unit 112 of the camera 100 are able to detect the reflected component of the irradiation light. On the other hand, when the rotation angle shows an unexpected wrong direction, the photometry sensor 113 and the photometry unit 112 of the camera 100 may not detect the reflected component of the irradiation light of the receiver-flash even if the elevation angle is adjusted. Accordingly, the rotation-angle decision control is performed prior to the elevation-angle decision.

In the step S502, the camera MPU 101 designates the rotation angle number "1" to the flash MPU 201 (designates through communication from a sender-flash in a case of a receiver-flash, the same applies to the following). The flash MPU 201 beforehand stores rotation angles corresponding to rotation angle numbers 1 through x (x=3 in this embodiment) and emission count N in a memory (not shown) built in the external flash 120. The camera MPU 101 decides a final target rotation angle RollAngle by repeating emission and photometry multiple times (N times, N=3 in this embodiment) while changing the rotation angle.

The value of the emission count N and the rotation angle that the rotation angle number shows can be changed by user's operations. Since the variation range of the rotation angle can be designated by a user's operation, irradiation of flash light in a direction other than the object direction can be prevented when the receiver-flash, which is installed toward the object in some extent, is controlled according to the result of the automatic irradiation-angle decision. It is similar for the variation range of the elevation angle.

The camera MPU 101 instructs the flash MPU 201 of the current evaluation target to control the movable part 122 to the rotation angle corresponding to the rotation angle number in step S503 and proceeds with the process to step S504. The camera MPU 101 issues an emission instruction to the flash MPU 201 of the flash of the current evaluation target, performs the photometry control by driving the photometry sensor 113 in the step S504 and proceeds with the process to step S505.

The camera MPU 101 performs well-known object weight generation so that a value in an area that should be modulated properly will become large on the basis of the output of the photometry sensor 113 in the step S505 and proceeds with the process to step S506. In the weight generation here, when there is a detection result obtained using an object detection function based on color, shape, motion, or a well-known face recognition function provided in the camera 100, the detection result is considered in the weight generation. The process here is equivalent to an example of the process of an object-parameter generation module of the present invention.

Moreover, a position in a screen is taken into consideration. For example, a generated weight may increase toward the center and may decrease toward the periphery even when the other evaluation indices are equivalent. Alternatively, when the irradiation modes are allocated so that the flash group A will be used to irradiate the object from the right side of the object and the flash group B will be used to irradiate the object from the left side of the object, the generated weights may differ between the right side and the left side in the screen.

In the step S506, the camera MPU 101 calculates a brightness weighted average used as an evaluation value on the basis of the output of the photometry sensor 113 and the object weight generated in the step S505, and proceeds with the process to step S507. It should be noted that the detection results obtained using the face recognition function and the object detection function on the basis of color, shape, motion, etc. may be used in this stage.

In the step S507, the camera MPU 101 determines whether the evaluations of the number of times (3 times in this embodiment) for the rotation angle decision have been completed. When the evaluations have not been completed, the process proceeds to step S508. When the evaluations have been completed, the process proceeds to step S509. The camera MPU 101 increments the rotation angle number in the step S508 and returns the process to the step S503 to repeat obtaining the evaluation value.

The camera MPU 101 calculates the target rotation angle RollAngle at which the evaluation value (brightness weighted average) becomes largest from the three evaluation values (brightness weighted averages) in the step S509 and proceeds with the process to step S510. The target rotation angle RollAngle may be calculated by finding the weighted average of the rotation angles corresponding to the evaluation values using the evaluation values as weights.

The camera MPU 101 instructs the flash MPU 201 of the current evaluation-target flash to adjust the rotation angle to the target rotation angle RollAngle in the step S510 and proceeds with the process to step S511. The flash MPU 201 of the current evaluation-target flash controls the movable part 122 according to the instruction from the camera MPU 101.

Subsequently, the process proceeds to the step S511. Since the process in the steps S511 through S519 is similar to the above-mentioned process in the steps S502 through S510 but the rotation angle control is replaced by an elevation-angle control, its description will be omitted. The flash-light-irradiation-angle decision control for one object-irradiation flash finishes so far. In conclusion, the angle is controlled so as to irradiate the area that is estimated to include the main object most brightly. When the flash corresponding to the current evaluation-target-flash number belongs to the background-irradiation flash group C in the step S501, the process proceeds to the step S520 in FIG. 6.

Figure 6:
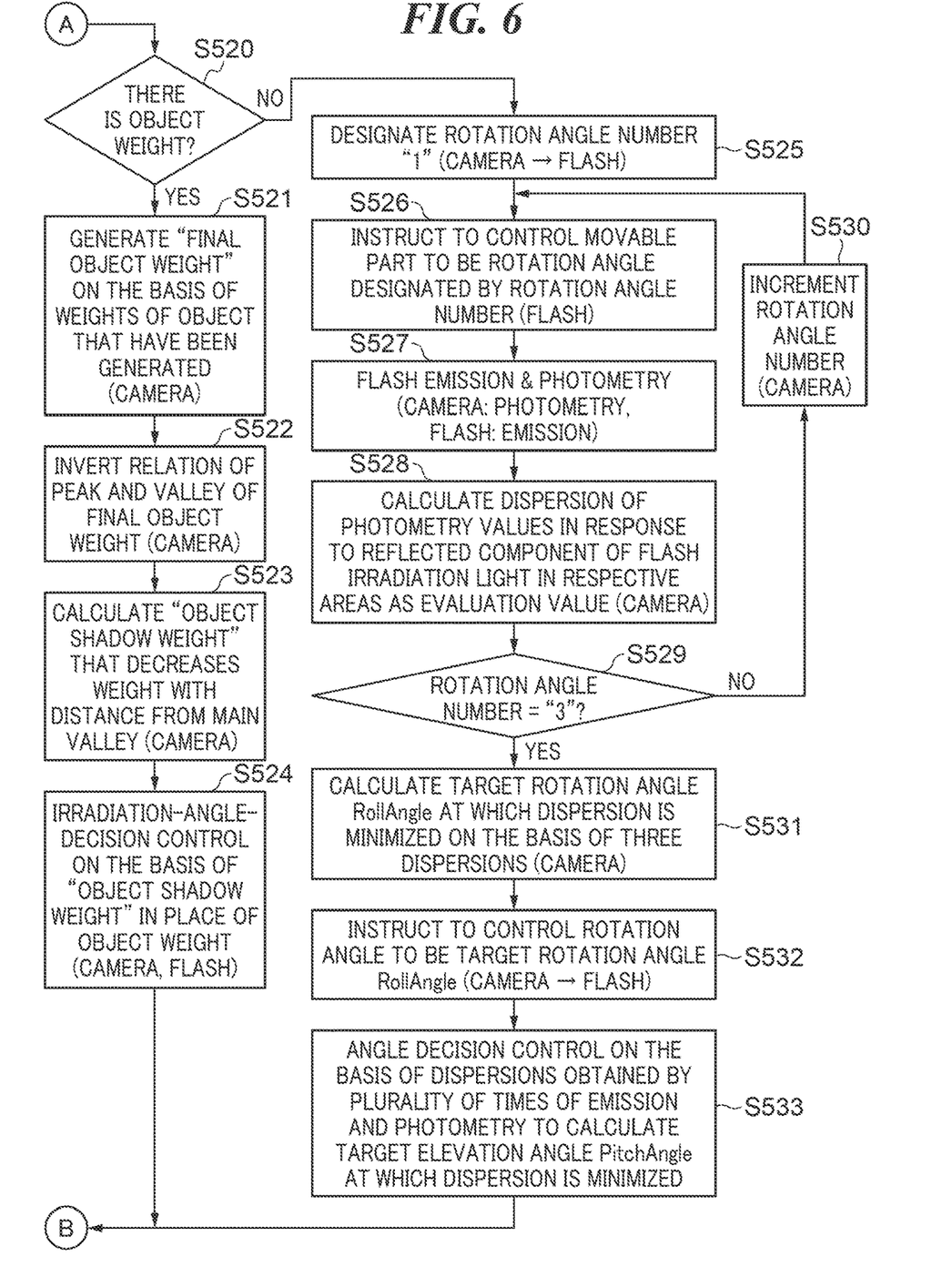
FIG. 6 is a flowchart describing automatic irradiation-angle decision control for each wireless flash.

In the step S520 in FIG. 6, the camera MPU 101 determines whether the object weight has been generated by performing the irradiation angle decision of the object-irradiation flash group before the irradiation angle decision of the current evaluation-target flash. Then, when the object weight has been generated, the camera MPU 101 proceeds with the process to step S521. Otherwise, the process proceeds to step S525.

The camera MPU 101 generates a final object weight from the object weights generated on the occasions of the irradiation angle decisions until now in the step S521 and proceeds with the process to step S522. The final object weight may be calculated as an additional value of weights of the flashes of which the irradiation angles were decided. Each of the weights is generated on the occasion of deciding a target elevation angle PitchAngle and is a value in a case where the elevation angle is nearest to the target elevation angle PitchAngle. An arithmetic mean or a weighted average that is found while changing weight of each flash may be used. The detection results obtained using the face recognition function and the object detection function on the basis of color, shape, motion, etc. may also be used.

The camera MPU 101 generates an inversion weight that is obtained by inverting the relation of peak and valley of the final object weight generated in the step S521 (a process for inverting levels of numeric values) in the step S522 and proceeds with the process to step S523. In the step S523, the camera MPU 101 processes the inversion weight obtained in the step S522 and generates an object shadow weight so that the value of the area that is estimated to include the object will become small, so that the value of the peripheral area in which a shadow tends to occur will become large, and so that the value will decrease with increasing distance from the object. The process here is equivalent to an example of the process of a background-parameter generation module of the present invention.

The object shadow weight is generated in the step S523 in order to set the flashes of the background-irradiation flash group to the irradiation angle so as to eliminate a shadow that tends to be caused by the object-irradiation flash light around the object.

Figure 8A:
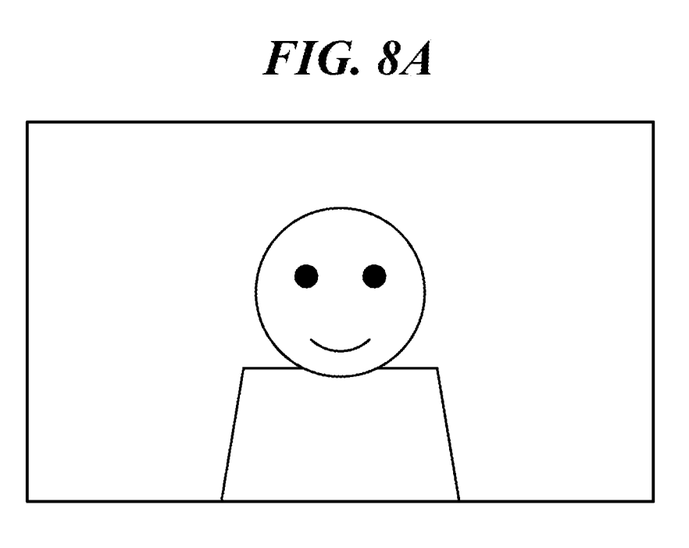
FIG. 8A and FIG. 8B are image views of a shadow caused by object-irradiation flash light.
Figure 8B:
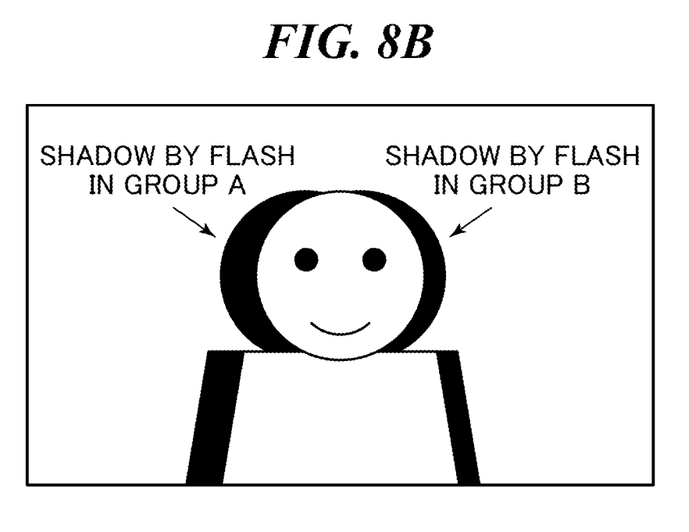

FIG. 8A and FIG. 8B are image views of a shadow caused by the object-irradiation flash light. Appearance of the shadow varies according to the arrangement of the object-irradiation flashes. For example, when the flash light of the group A irradiates the object from the right side and the flash light of the group B irradiates the object from the right side as shown in FIG. 8A, a shadow shown in FIG. 8B may occur. The irradiation angle of the flashes of the background-irradiation flash group is found by the calculation that particularly evaluates the shadow area using the object shadow weight generated in the step S523.

Figure 7A:
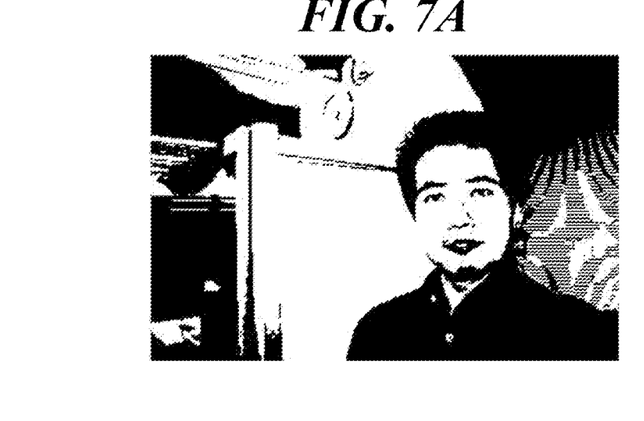
FIG. 7A through FIG. 7D are image views describing an object-shadow-weight generation process.
Figure 7B:
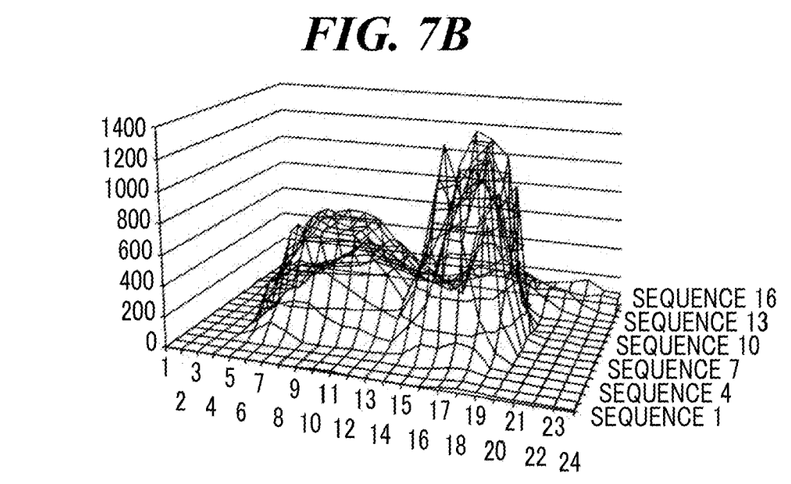

FIG. 7A through FIG. 7D are image views of the generation of the object shadow weight by the calculation in the step S523. FIG. 7A is an image view of a taken image, and FIG. 7B is an image view (three-dimensional graph) of the object weight. A near side of the three-dimensional graph in FIG. 7B corresponds to a lower side of the taken image in FIG. 7A. An axis extending in a right-far direction at a right side of the three-dimensional graph in FIG. 7B corresponds to a right side of the taken image in FIG. 7A. A height direction in the three-dimensional graph in FIG. 7B corresponds to a level of a numeric value of the weight.

Figure 7C:
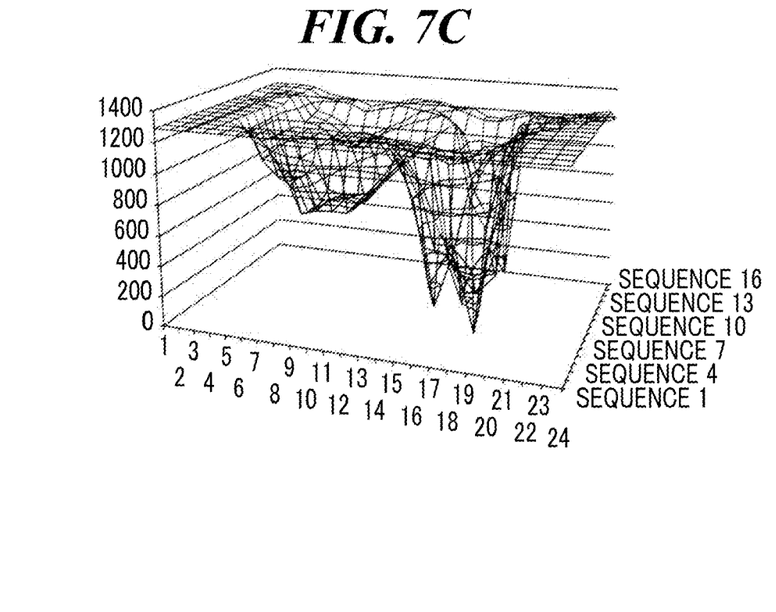
Figure 7D:
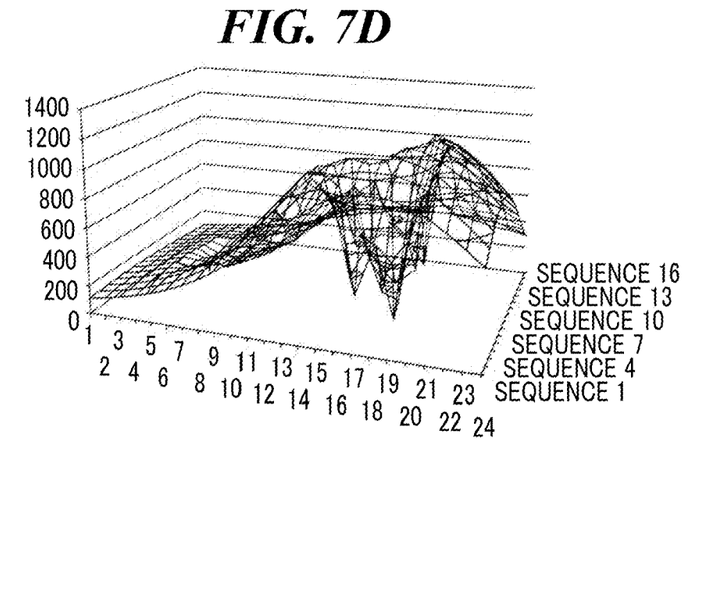

FIG. 7C is the image view (three-dimensional graph) of the inversion weight that is obtained by inverting the relation of peak and valley of the object weight shown in FIG. 7B. FIG. 7D is the image view (three-dimensional graph) of the object shadow weight that has processed so that the numerical value of the weight decreases with increasing distance from the object. On the occasion of this process, the process to decrease the weight with increasing distance from the face area using face detection information is performed. The detection result obtained using the object detection function on the basis of color, shape, motion, etc. may be used in addition to the face detection function.

Aside from the method in the steps S521 through S523, there is an object-shadow-weight generation method that enlarges a numerical value of a shadow part of the object that actually occurs by the object-irradiation flash light on the basis of the photometry result at the time of the irradiation angle decision of the flashes belonging to the object-irradiation flash group.

As the generation method, a method that calculates difference or ratio of the photometry result at the time of non-emission and the photometry result at the time of flash emission for deciding the irradiation angle of the object-irradiation flash and enlarges the numerical value in the area of which the difference or ratio is smaller may be used. The final object shadow weight is generated on the basis of the additional value or average of the object shadow weights for the flashes obtained by this method or on the basis of the weighted average in which a weight for each flash is changed.

Referring back to FIG. 6, since the process in step S524 is similar to the flash-light irradiation angle decision for the object-irradiation flash group and is the same as the process in the steps S502 through S519 in FIG. 5 (except for the steps S505 and S514 of the weight generation process), its description is omitted.

When it is determined that the irradiation angle decision of the object-irradiation flash group has not been performed and that the object weight is not generated prior to the irradiation angle decision of the current evaluation-target flash in the step S520, the process proceeds to step S525.

The camera MPU 101 designates the rotation angle number "1" to the camera MPU 201 in the step S525 as with the step S502 and proceeds with the process to step S526. The camera MPU 101 instructs the flash MPU 201 of the current evaluation target to control the movable part 122 to the rotation angle corresponding to the rotation angle number in the step S526 as with the step S503 and proceeds with the process to step S527.

The camera MPU 101 issues an emission instruction to the flash MPU 201 of the flash of the current evaluation target, performs the photometry control by driving the photometry sensor 113 in the step S527 as with the step S504 and proceeds with the process to step S528. The camera MPU 101 finds a scattering condition of the photometry values of the respective areas obtained from the photometry unit 112 in the step S527 as an evaluation value in the step S528, and proceeds with the process to step S529. Although dispersion is used as the evaluation value showing the scattering condition specifically, other indices, such as a standard deviation, may be used.

In the step S529, the camera MPU 101 determines whether the evaluation of the rotation angle number "3" for the rotation angle decision has been completed. When the evaluation has not been completed, the process proceeds to step S530. When the evaluation has been completed, the process proceeds to step S531. The camera MPU 101 increments the rotation angle number in the step S530 and returns the process to the step S526 to repeat obtaining the evaluation value.

The camera MPU 101 calculates the target rotation angle RollAngle at which the evaluation value (dispersion) becomes largest from the three evaluation values (dispersions) in the step S513 and proceeds with the process to step S532. The target rotation angle RollAngle may be calculated as the weighted average of the rotation angles corresponding to the evaluation values using values obtained by inverting the relation of the evaluation values as weights.

When a receiver-flash of the background-irradiation flash group is used alone, it is assumed that a main object is sufficiently irradiated by steady light other than the flash light. The reason why the flash irradiation angle is found so that the photometry values within the screen including the object become nearly uniform by the above-mentioned estimation is that the receiver-flash that is used alone is required to irradiate uniformly by elimination of brightness difference in the background including elimination of the shadow of the object caused by the steady light.

The camera MPU 101 instructs the flash MPU 201 of the current evaluation-target flash to adjust the rotation angle to the target rotation angle RollAngle in the step S532 as with the step S510 and proceeds with the process to step S533. The flash MPU 201 of the current evaluation-target flash controls the movable part 122 according to the instruction from the camera MPU 101.

Since the process in the steps S533 is similar to the above-mentioned process in the steps S525 through S532 but the rotation angle control is replaced by the elevation-angle control, its description will be omitted. The flash-light-irradiation-angle decision control for one flash finishes so far.

As mentioned above, an irradiation angle of each external flash 120 is controlled so as to irradiate an object or a background of the object in accordance with the setting in photographing using a plurality of external flashes 120 in this embodiment.

Figure 9:
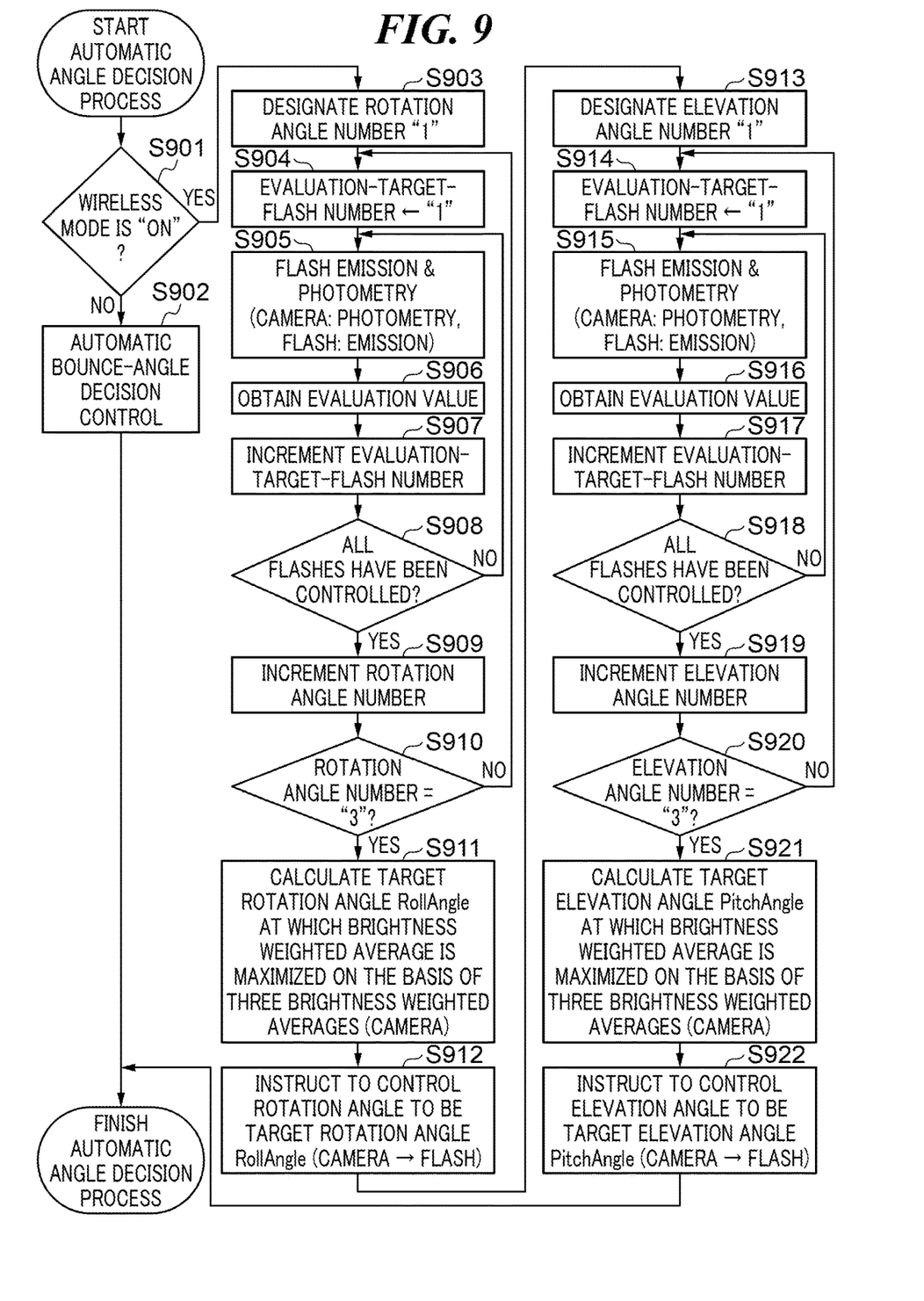
FIG. 9 is a flowchart describing automatic angle-decision control for a flash-light irradiation angle in a digital camera as an image pickup apparatus according to a second embodiment of the present invention.

Next, a camera that is an image pickup apparatus according to a second embodiment of the present invention will be described by referring to FIG. 9. FIG. 9 is a flowchart describing automatic angle-decision control for a flash-light irradiation angle. It should be noted that duplicated sections or corresponding section with respect to the above-mentioned first embodiment will be described by diverting the figures and the signs.

The processes in steps S901 and S902 in FIG. 9 are respectively similar to that in the steps S401 and S402 in FIG. 4. In step S903, the camera MPU 101 designates the rotation angle number "1" to the flash MPU 201 of every flash that is subjected to an irradiation-angle-decision control. Moreover, the camera MPU 101 instructs the flash MPU 201 of the current evaluation-target flash to control the movable part 122 to the rotation angle corresponding to the rotation angle number and proceeds with the process to step S904.

The camera MPU 101 sets the evaluation-target-flash number to "1" in the step S904 and proceeds with the process to step S905. The camera MPU 101 issues an emission instruction to the flash MPU 201 of the current evaluation-target flash, performs the photometry control by driving the photometry sensor 113 in the step S905 as with the step S504 in FIG. 5, and proceeds with the process to step S906. The camera MPU 101 obtains a brightness weighted average (evaluation value) through the processes that are identical to that in the steps S505 and S506 in FIG. 5 in the step S906 and proceeds with the process to step S907.

The camera MPU 101 increments the evaluation-target-flash number in the step S907 as with the step S405 in FIG. 4 and proceeds with the process to step S908. In the step S908, when there is a flash corresponding to the current evaluation-target-flash number, the camera MPU 101 returns the process to the step S905 to perform the irradiation angle control for the flash concerned. When there is no flash corresponding to the current evaluation-target-flash number, the process proceeds to step S909. Thus, the evaluation value in the flash-light-irradiation-angle decision control is obtained for each flash one by one.

The camera MPU 101 increments the rotation angle number in the step S909 and proceeds with the process to step S910. In the step S910, the camera MPU 101 determines whether the evaluations of three times for the rotation angle decision have been completed. When the evaluations have not been completed, the process returns to the step S905. When the evaluations have been completed, the process proceeds to step S911. The camera MPU 101 finds the target rotation angle RollAngle for every flash that is subjected to the irradiation-angle-decision control in the step S911 through the process similar to the process in the step S509 in FIG. 5 and proceeds with the process to step S912.

The camera MPU 101 instructs the flash MPU 201 of every flash that is subjected to the irradiation-angle-decision control to adjust the rotation angle to the target rotation angle RollAngle in the step S912 and proceeds with the process to step S913. The flash MPU 201 of each flash controls the movable part 122 according to the instruction from the camera MPU 101. Since the following processes in steps S913 through S922 is similar to the above-mentioned processes in the steps S903 through S912 but the rotation angle control is replaced by the elevation-angle control, its description will be omitted.

Although the above description does not distinguish the object-irradiation flash group and background-irradiation flash group, the process in FIG. 9 may be performed multiple times for the respective flash groups. In such a case, the parameters generated for the flash-light-irradiation-angle decision of the object-irradiation flash group can be used in the flash-light-irradiation-angle decision of the background-irradiation flash group. The other configurations and operation effects are the same as that of the above-mentioned first embodiment.

It should be noted that the present invention is not limited to the contents that are exemplified in the above-mentioned embodiments. The contents can be changed suitably as long as they do not deviate from the subject matter of the present invention, and parts of the above-mentioned embodiment may be combined suitably.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-008883, filed Jan. 23, 2018, which is hereby incorporated by reference herein in its entirety.

What is claimed is:

1. An image pickup apparatus controlling external flashes that are communicably connected and have light emitting units of which irradiation angles are variable, the image pickup apparatus comprising:
a photometry device that obtains a photometry value;
a memory device that stores a set of instructions; and
at least one processor that executes the set of instructions to:
obtain photometry values at times of emissions at each of different irradiation angles for each of the external flashes;
generate an evaluation value at each of the different irradiation angles based on a photometry result obtained by the photometry device; and
decide an irradiation angle for photographing of each of the external flashes based on the evaluation values generated.

2. The image pickup apparatus according to claim 1, wherein the external flashes include an object-irradiation flash that irradiates an object and a background-irradiation flash that irradiates a background of the object.

3. The image pickup apparatus according to claim 2, wherein the at least one processor executes instructions in the memory device to:
generate an object parameter for evaluating an area that is estimated to include a main object from a reflected component of flash light based on the photometry result obtained by the photometry device in a case where the object-irradiation flash is used, and
generate the evaluation value at each of the different irradiation angles based on the object parameter generated and the photometry result obtained by the photometry device.

4. The image pickup apparatus according to claim 3, wherein at least one processor executes instructions in the memory device to:
detect an object; and
calculate distance to the object,
wherein the object parameter is generated using at least one of information about the object detected, information about the distance to the object calculated, and a photographing direction.

5. The image pickup apparatus according to claim 3, wherein the at least one processor executes instructions in the memory device to:
generate a background parameter for evaluating a background of the main object based on the evaluation value, which is generated in the case where the object-irradiation flash is used, in a case where the background-irradiation flash is used, and
generate the evaluation value based on the background parameter generated and the photometry result obtained by the photometry device.

6. The image pickup apparatus according to claim 5, wherein the at least one processor executes instructions in the memory device to:
generate the background parameter using the object parameter that is generated in the case where the object-irradiation flash is used.

7. The image pickup apparatus according to claim 5, wherein the at least one processor executes instructions in the memory device to:
detect an object; and
calculate distance to the object,
wherein the background parameter is generated using at least one of information about the object detected, information about the distance to the object calculated, and a photographing direction.

8. The image pickup apparatus according to claim 5, wherein the at least one processor executes instructions in the memory device to:
process the background parameter by detecting an area of a shadow of the object caused by irradiation light of the object-irradiation flash based on the evaluation value that is generated in the case where the object-irradiation flash is used.

9. The image pickup apparatus according to claim 2, wherein the at least one processor executes instructions in the memory device to:
generate the evaluation value based on a scattering condition of the photometry values of the areas by the photometry device in the case where the background-irradiation flash is used.

10. The image pickup apparatus according to claim 2, wherein each of the light emitting units is able to change irradiation angles in a direction of a rotation angle and a direction of an elevation angle, and
wherein a target rotation angle of each of the external flashes is decided while changing the irradiation angle in the direction of the rotation angle and decides a target elevation angle of each of the external flashes while changing the irradiation angle in the direction of the elevation angle.

11. The image pickup apparatus according to claim 10, further comprising an operation unit through which a variation range of the rotation angle is designated by a user's operation.

12. The image pickup apparatus according to claim 11, wherein the operation unit receives a user's operation to designate a variation range of the elevation angle.

13. The image pickup apparatus according to claim 1, wherein one of the external flashes is detachably attached to the image pickup apparatus.

14. A control method for an image pickup apparatus controlling external flashes that are communicably connected to one another and have light emitting units of which irradiation angles are variable, the control method comprising:
   a photometry step of obtaining photometry values at times of emissions at each of different irradiation angles for each of the external flashes;
   a generation step of generating an evaluation value at each of the different irradiation angles based on a photometry result obtained in the photometry step; and
   a decision step of deciding an irradiation angle of each of the external flashes based on the evaluation values generated in the generation step.

* * * * *